US010941732B1

(12) United States Patent
Ehlert et al.

(10) Patent No.: US 10,941,732 B1
(45) Date of Patent: Mar. 9, 2021

(54) MEMBRANE STRUCTURES FOR THE CONTROL OF FUEL VAPOR EMISSIONS

(71) Applicant: MAHLE International GmbH, Stuttgart (DE)

(72) Inventors: Thomas Ehlert, Böblingen (DE); Achim Gommel, Weil der Stadt (DE); John Jackson, Oxford, MI (US); Simon Streng, Stuttgart (DE); Melanie Volz, Königsbach (DE)

(73) Assignee: MAHLE International GmbH, Stuttgart (DE)

( * ) Notice: Subject to any disclaimer, the term of this patent is extended or adjusted under 35 U.S.C. 154(b) by 0 days.

(21) Appl. No.: 16/706,895

(22) Filed: Dec. 9, 2019

(51) Int. Cl.
*F02M 25/08* (2006.01)
*B60K 15/03* (2006.01)

(52) U.S. Cl.
CPC ......... *F02M 25/0854* (2013.01); *B60K 15/03* (2013.01); *F02M 25/089* (2013.01); *B60K 2015/03078* (2013.01); *B60K 2015/03296* (2013.01)

(58) Field of Classification Search
CPC .. F02M 25/0854; F02M 25/089; B60K 15/03; B60K 2015/03078; B60K 2015/03296
USPC ........................................................ 123/519
See application file for complete search history.

(56) References Cited

U.S. PATENT DOCUMENTS

| | | | |
|---|---|---|---|
| 5,611,841 A * | 3/1997 | Baker ..................... | B01D 53/22 95/50 |
| 5,957,113 A | 9/1999 | Masaki et al. | |
| 6,772,740 B2 | 8/2004 | Kojima et al. | |
| 7,261,092 B1 | 8/2007 | Oku et al. | |
| 9,732,649 B2 | 8/2017 | Hiltzik et al. | |
| 2005/0098160 A1 * | 5/2005 | Taxon ................ | F02M 25/0836 123/516 |
| 2008/0308074 A1 * | 12/2008 | Allen ................... | F02M 25/089 123/519 |
| 2015/0285190 A1 * | 10/2015 | Shimizu ................. | F02D 23/02 123/294 |
| 2017/0304763 A1 * | 10/2017 | Nelson ............... | B01D 46/0005 |

FOREIGN PATENT DOCUMENTS

| | | |
|---|---|---|
| DE | 102006033062 A1 | 1/2008 |
| EP | 0663588 A1 | 7/1995 |
| JP | 2010106766 A | 5/2010 |

\* cited by examiner

*Primary Examiner* — Mahmoud Gimie
(74) *Attorney, Agent, or Firm* — Dickinson Wright PLLC

(57) ABSTRACT

A canister for use in an evaporative emission control system that includes an external housing; a membrane module separating the external housing into an inlet side and an outlet side; an entrance located on the inlet side in fluid communication with a fuel tank, such that a vapor mixture flows into the inlet side; an exit located on the outlet side in fluid communication with an internal combustion engine; a first valve that reversibly connects the inlet side to atmosphere; and optionally, a second valve that reversibly connects the outlet side to atmosphere. The membrane module includes one or more structured membranes having a surface with a plurality of folds, the membrane being shaped as a flat sheet or into a cylindrical geometry. The vapor mixture flows from the entrance along the surface of the membrane, such that gaseous fuel vapor permeates through the membrane to the outlet side.

19 Claims, 10 Drawing Sheets

MEMBRANE STRUCTURES FOR THE CONTROL OF FUEL VAPOR EMISSIONS

FIELD

This disclosure relates generally to evaporative emission control (EVAP) systems used with internal combustion engines. More specifically, this disclosure relates to membrane structures for the control of fuel vapor emissions.

BACKGROUND

The statements in this section merely provide background information related to the present disclosure and may not constitute prior art.

Due to the volatility of conventional fuels, a rise in environmental temperature results in an increase in the vapor pressure within a closed fuel tank. In order to reduce the internal pressure and prevent the leaking of fuel vapor from the fuel tank into the atmosphere, the fuel vapor is vented through a conduit to a canister that contains an adsorbent material that is capable of adsorbing the vapor. While the internal combustion engine is operating, purge air is drawn from the atmosphere through the canister and into the engine. As this ambient air flows through the canister, it desorbs the fuel vapors held by the adsorbent material, thereby reactivating the adsorbent material.

However, the purge air does not always desorb all of the fuel vapor that is held by the adsorbent material. Overtime, these residual hydrocarbons, which remain in the canister, can leak into the atmosphere. In addition, these residual hydrocarbons may also reduce the effectiveness of the adsorbent material, thereby, allowing fuel vapor to be emitted to the atmosphere. This latter situation, which is commonly referred to as "diurnal breathing losses (DBL)", may become more prevalent after several days of being exposed to ambient temperature changes.

Several methods of reducing diurnal breathing loss (DBL) emissions include: (i) increasing the volume of purge gas that passes through the canister; (ii) heating the purge air, the adsorbent material, or both; and (iii) using multiple canisters or canister compartments in series, wherein each canister or compartment contains an absorbent material. Although the above methods may reduce DBL emissions, the significant environmental concern regarding the impact of fuel emissions continues to drive the development of new technologies and methods for further improvement of evaporative emission control systems.

SUMMARY

The present disclosure generally provides a canister for use in an evaporative emission control (EVAP) system. This canister comprises: an external housing; a membrane module that separates the external housing into an inlet side and an outlet side; an entrance located on the inlet side of the external housing, the entrance being in fluid communication with a fuel tank, such that a vapor mixture from the fuel tank flows into the inlet side of the external housing; an exit located on the outlet side of the external housing, the exit being in fluid communication with an internal combustion engine; a first valve that reversibly connects the inlet side of the external housing to atmosphere; and optionally a second valve that reversibly connects the outlet side of the external housing to atmosphere.

The membrane module includes one or more structured membranes that have a surface with a plurality of pleats or folds. The one or more structured membranes are shaped as a flat sheet or into a cylindrical geometry. The vapor mixture flows from the entrance in the inlet side of the external housing along the surface of the one or more structured membranes, such that gaseous fuel vapor (e.g., combustible hydrocarbons) present in the vapor mixture permeates through the membrane to the outlet side of the external housing. The one or more structured membranes comprise an organic polymer, a copolymer, or a mixture thereof that is permeable to fuel vapor, an adsorbent material that adsorbs the fuel vapor, or a combination thereof.

According to one aspect of the present disclosure, the membrane module further comprises one or more flow guide rails or baffles, such that the flow of the vapor mixture along the surface of the one or more structured membranes is uniformly distributed.

According to another aspect of the present disclosure, the plurality of pleats or folds in the one or more structured membranes are asymmetrically folded. In this case, the surface area of the structured membrane exposed to the vapor mixture is greater adjacent to the entrance and tapers to a progressively smaller surface area along a length (L) of the structured membrane. The structured membrane may be linearly folded or rotary wound.

According to another aspect of the present disclosure, the membrane module comprises at least two structured membranes with the surface of the structured membranes being parallel to one another and connected together at one end. In this case, the vapor mixture flows centrally between the surface of the two structured membranes. When desired, the at least two structured membranes may be substantially the same.

According to yet another aspect of the present disclosure, the pleats or folds of the at least two structured membranes are positioned, such that the flow of the vapor mixture perpendicularly intersects with the surface of the structured membranes.

According to yet another aspect of the present disclosure, the one or more structured membranes may comprise at least one alternative form among the pleats or folds that is orthogonal to a length (L) of the structured membranes. The alternative form may be over a localized portion of the surface or over the entire surface of the one or more structured membranes. The alternative form may be selected, without limitation, as one among the group of a bulge, a crease, a bead, or a wave. When desirable, the one or more structured membranes may further comprise a turbulence generator located approximate to or superimposed upon the at least one alternative form.

According to another aspect of the present disclosure, the external housing includes an internal wall on the inlet side that creates a greater flow channel for the vapor mixture near the entrance and tapers to a progressively smaller flow channel along the length (L) of the one or more structured membranes. The external housing may optionally include an internal wall on the outlet side that creates a greater flow channel for the gaseous fuel vapor near the exit and tapers to a progressively smaller flow channel along the length (L) of the one or more structured membranes.

According to another aspect of the present disclosure, an evaporative emission control (EVAP) system for use in reducing diurnal breathing loss (DBL) emissions is provided. This EVAP system comprises the canister described above and further defined herein. The canister may be connected in series to a second or main canister that contains an adsorbent material capable of adsorbing fuel vapor. When desirable, the canister or the second canister may include a plurality of structured membranes.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way. It should be understood that throughout the description, corresponding reference numerals indicate like or corresponding parts and features.

DETAILED DESCRIPTION

The following description is merely exemplary in nature and is in no way intended to limit the present disclosure or its application or uses. For example, the membrane structures made and used according to the teachings contained herein is described throughout the present disclosure in conjunction with a canister (e.g., an auxiliary canister) incorporated into an evaporative emission control (EVAP) system of an automobile in order to more fully illustrate the construction and the use thereof. The incorporation and use of such membrane structures in EVAP systems utilized (i) in other internal combustion engine applications, including trucks, boats & ships, off-road vehicles, construction equipment, and hybrid vehicles, or the like, or (ii) in the primary canister (e.g., a second canister) of the EVAP system or a compartment located therein are contemplated not to exceed the scope of the present disclosure.

The diurnal breathing loss (DBL) emissions that arise from these other internal combustion engine applications may actually be greater than the DBL emissions that arise from an automobile. For example, boats, off-road vehicles, and construction equipment are less frequently utilized than automobiles. Thus, the fuel in the fuel tank of these other vehicles may experience a greater degree of ambient temperature changes. Since these other vehicles may sit idle for longer periods of time between uses, the absorbent material in the EVAP system may be exposed to fewer purge cycles. Similarly, since hybrid vehicles include both an internal combustion engine and an electric motor, the internal combustion engine is not utilized over a substantial amount of the time the vehicle is operated. Thus the absorbent material used in the EVAP system of a hybrid vehicle may also be exposed to a lower frequency of purge cycles.

Figure 1A:
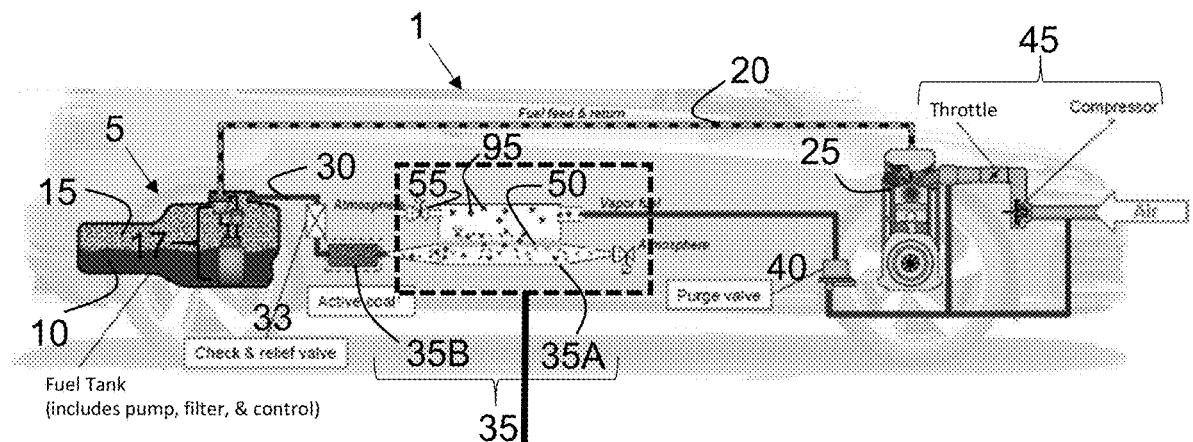
FIG. 1A is a schematic representation of an evaporative emission control (EVAP) system formed according to the teachings of the present disclosure.

The present disclosure generally provides a canister for use in an evaporative emission control (EVAP) system to reduce diurnal breathing loss (DBL) emissions. Referring to FIG. 1A, an EVAP system 1 generally comprises a fuel tank 5 along with fuel 10 and associated vapor mixture 15 of fuel vapor and air, as well as a pump, filter, & controls combination 17, and a fuel feed and return conduit 20 coupled to an internal combustion engine 25. The upper portion of the fuel tank includes a second conduit 30 pathway that comprises a check & relief valve 33, one or more canisters 35, a purge valve 40 coupled to an air intake compressor and throttle section 45 of the internal combustion engine 25.

The canisters 35 in the EVAP system 1 may include at least two canisters 35A, 35B positioned to be in series with one another. When desirable one of the canisters 35A may include a membrane module 50 as further described herein. The other canister 35B may comprise an adsorbent material capable of adsorbing fuel vapor. This adsorbent material may include, but not be limited to activated carbon, carbon charcoal, zeolites, clays, porous polymers, porous alumina, porous silica, molecular sieves, kaolin, titania, ceria, or combinations thereof.

Still referring to FIG. 1A, when the internal combustion engine 25 is not operating, the vapor mixture 15 in the fuel tank 5 may enter the second conduit pathway 30 through the check and relief valve 33 and into the canister 35B that contains the absorbent material. The vapor mixture 15 diffuses through the adsorbent material in the canister 35B before entering the other canister 35A. A portion of the vapor mixture 15 (i.e., the fuel vapor 95) diffuses through the membrane module 50 located within the canister 35A. When the internal combustion engine 25 is operating, ambient air from the atmosphere (e.g., air) is drawn into the canister 35A through the vent valve 55. This purge air mixes with the fuel vapor and flows through the purge valve 40 into the air intake compressor and throttle section 45 of the internal combustion engine 25. When the internal combustion engine 25 is not operating the vent port or valve 55 is typically closed (i.e., except when cleaning the system) in order to prevent any fuel vapor 95 from being released to the atmosphere.

Figure 1B:
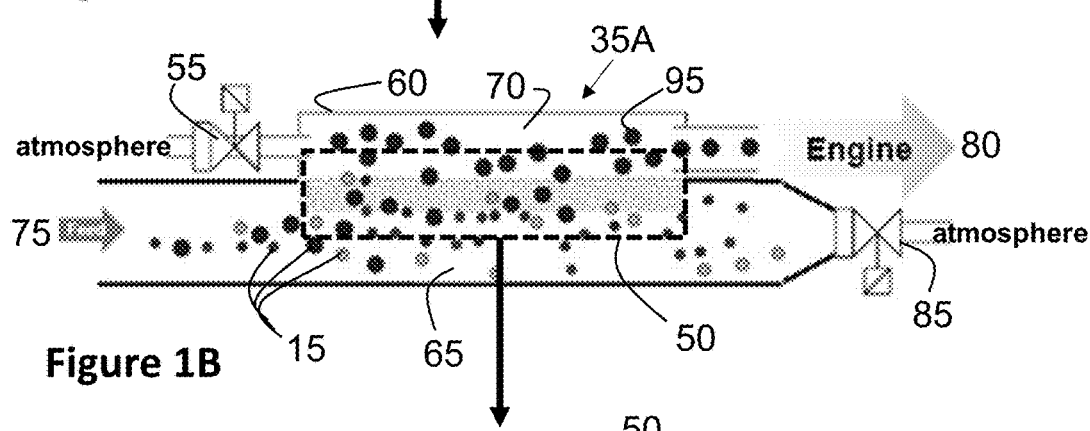
FIG. 1B is a schematic representation of a canister used in the EVAP system of FIG. 1A.
Figure 1C:
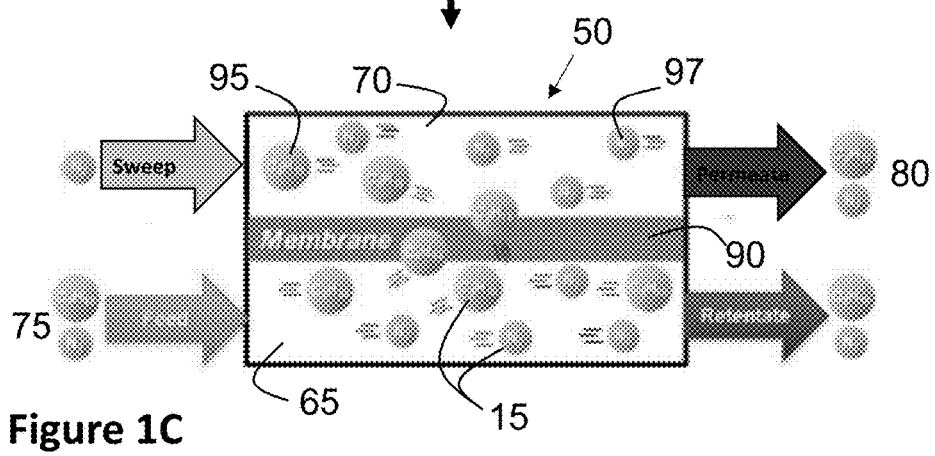
FIG. 1C is a schematic representation of the membrane module in the canister of FIG. 1B.

Referring now to FIGS. 1B and 1C, in one of the canisters 35A, a membrane module 50 is used to separate fuel vapor (e.g., combustible hydrocarbons) 95 from the vapor mixture 15. Due to the installation location of the canister 35A within a vehicle, the smallest possible design is preferable. On the other hand, the operating principle associated with the membrane module 50 requires that the largest possible membrane 90 surface be used, while at the same time ensuring that the flow resistance does not exceed a predetermined value.

Still referring to FIGS. 1B and 1C, the canister 35A generally comprises: an external housing 60; a membrane unit 50 that separates the external housing 60 into an inlet side 65 and an outlet side 70; an entrance 75 located on the inlet side 65 of the external housing 60, the entrance 75 being in fluid communication with a fuel tank (5, shown in FIG. 1A), such that vapor mixture 15 from the fuel tank 5 flows into the inlet side 65 of the external housing 60; an exit 80 located on the outlet side 70 of the external housing 60, the exit 80 being in fluid communication with an internal combustion engine (25, shown in FIG. 1A); a first valve 55 that reversibly connects the inlet side 65 of the external housing 60 to atmosphere; and optionally, a second valve 85 that reversibly connects the outlet side 70 of the external housing 60 to atmosphere.

Figure 2A:
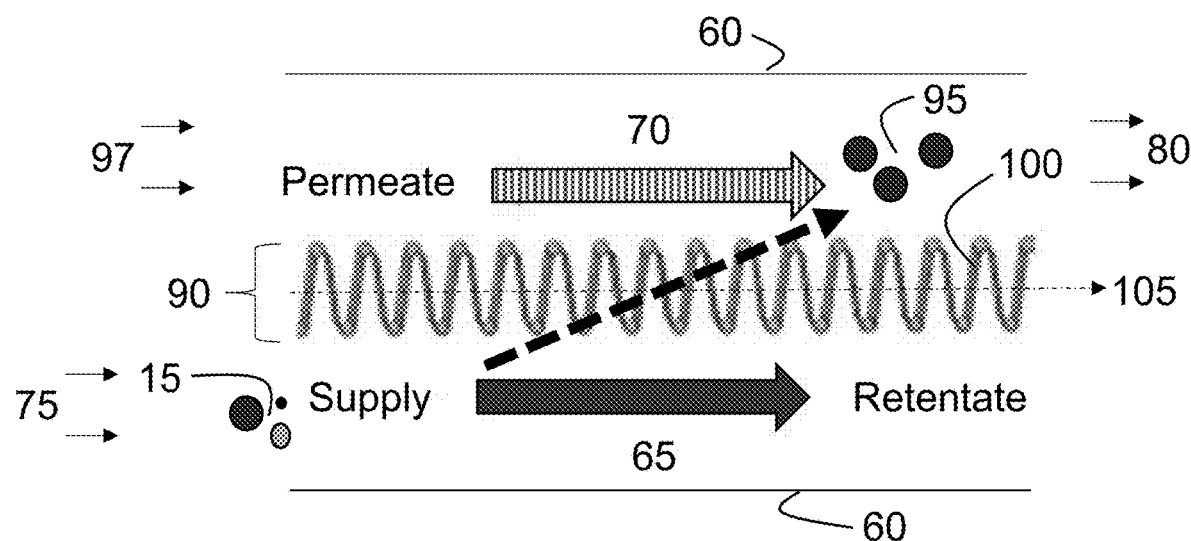
FIG. 2A is a schematic representation of a structured membrane used in the membrane module formed according to the teachings of the present disclosure.
Figure 2B:
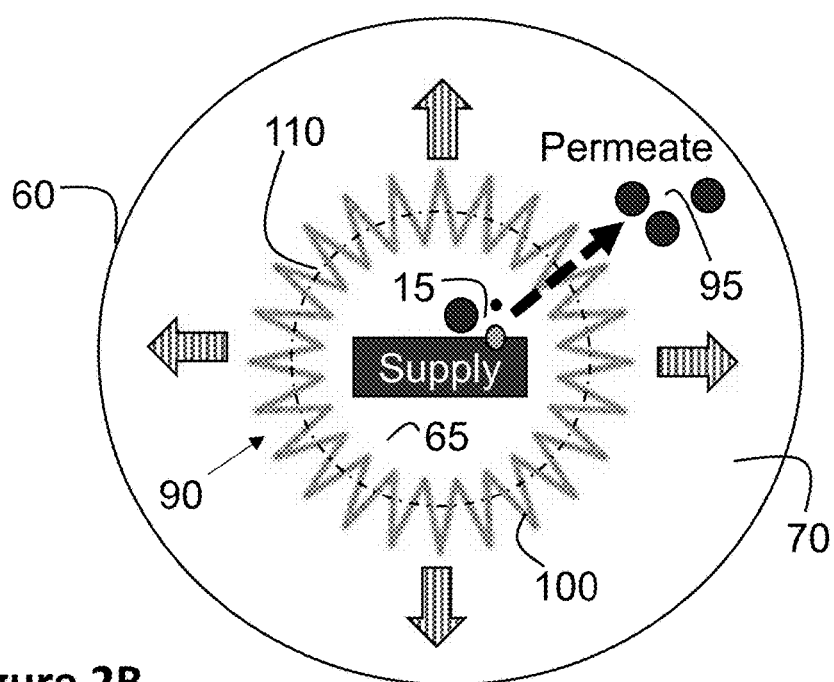
FIG. 2B is a schematic representation of another structured membrane used in the membrane module.

Referring now to FIGS. 2A and 2B in addition to FIGS. 1B and 1C, the membrane unit 50 includes one or more structured membranes 90 having a surface with a plurality of pleats or folds 100; the one or more structured membranes 90 being shaped as a flat sheet 105 or into a cylindrical geometry 110. During operation, the vapor mixture 15 flows from the entrance 75 in the inlet side 65 of the external housing 60 along the surface of the one or more structured membranes 90, such that fuel vapor 95 (e.g., gaseous combustible hydrocarbons) that are present in the vapor mixture 15 permeate through the membrane 90 to the outlet side 70 of the external housing 60. The fuel vapor 95 may be subsequently mixed with purge air 97 drawn into the outlet side 70 side of the external housing 60 when the internal combustion engine (25, shown in FIG. 1A) is operating. When desirable, the canister 35A may comprise a plurality of structured membranes 90. Although the flow of the vapor mixture 15 in the inlet side 65 and the flow of fuel vapor 95 and purge air 97 in the outlet side 70 are shown in the Figures to be in one direction, e.g., the same direction, one skilled in the art will understand that such flow may be in another direction, e.g., in different directions, without exceeding the scope of the present disclosure.

Each of the structured membranes 90 may be individually selected to comprise one or more organic polymers, inorganic polymers, including without limitation silicones or polysiloxanes, or a mixture or copolymer thereof that is permeable to gaseous combustible hydrocarbons, an adsorbent material that adsorbs the fuel vapor, or a combination thereof. The structured membranes 90 are capable of separating fuel vapor 95 (e.g., gaseous combustible hydrocarbons) from the other components 97 (e.g., oxygen, nitrogen, etc.) present in the vapor mixture 15 arising from a fuel tank 5. According to one aspect of the present disclosure, this separation process may be accomplished via a solubility-diffusion type mechanism. This type of mechanism may be dependent upon the molecular size and polarity of the species being adsorbed by (e.g., solubility) and/or diffused through (e.g., diffusion) the structured membranes 90.

For the purpose of this disclosure the terms "about" and "substantially" are used herein with respect to measurable values and ranges due to expected variations known to those skilled in the art (e.g., limitations and variability in measurements).

For the purpose of this disclosure, the terms "at least one" and "one or more of" an element are used interchangeably and may have the same meaning. These terms, which refer to the inclusion of a single element or a plurality of the elements, may also be represented by the suffix "(s)" at the end of the element. For example, "at least one membrane", "one or more membranes", and "membrane(s)" may be used interchangeably and are intended to have the same meaning.

The canister 35A, which includes the membrane module 50, allows for cost effective production with machinery and equipment that is currently used for the manufacture of air filter technology. When desirable, similar methods and concepts of connecting the membrane 90 to the external housing 60 as currently used with air filter technology may be utilized in the construction of the canisters of the present disclosure. In addition, various geometries associated with air filter technology may be contemplated for use with the structured membranes without exceeding the scope of the present disclosure. The structured membranes of the present disclosure as described herein provide a large membrane surface area while occupying a relatively small volume or space.

Figure 3A:
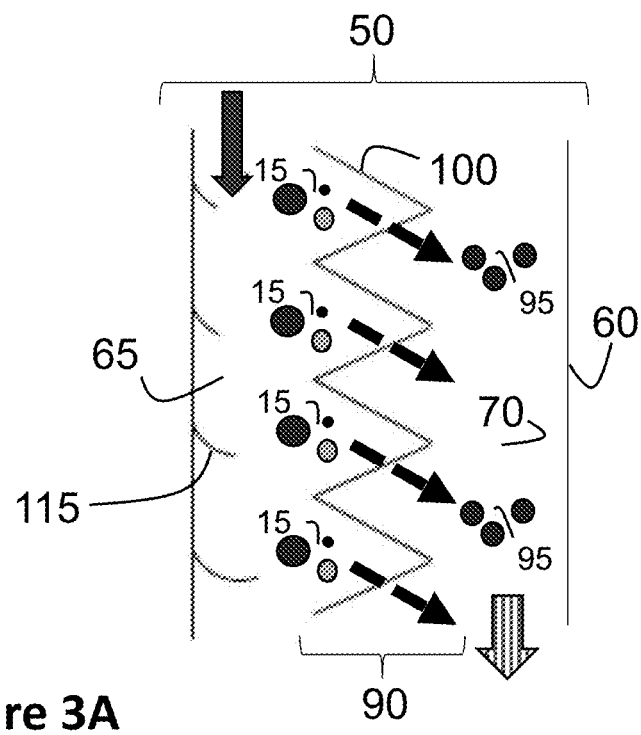
FIG. 3A is a schematic representation of a membrane module that incorporates one or more flow guide rails or baffles to provide uniform flow distribution.
Figure 3B:
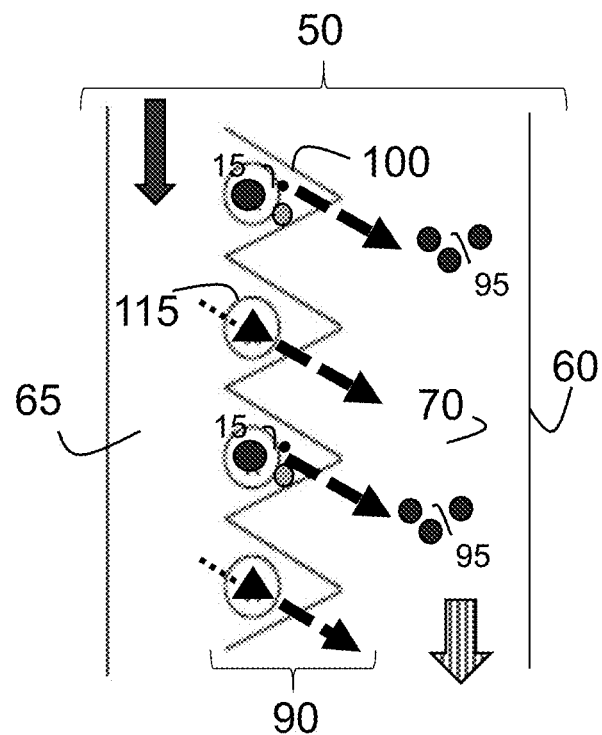
FIG. 3B is a schematic representation of another membrane module that incorporates one or more flow guide rails or baffles to provide uniform flow distribution.

Referring now to FIGS. 3A and 3B, the membrane module 50 may further comprise one or more flow guide rails or baffles 115. The purpose of the flow guide rails or baffles 115 is to focus the vapor mixture 15 to flow along the surface of the one or more structured membranes 90 and is uniformly distributed therewith in order to ensure permeation of the fuel vapor 95 over the entire surface of the membrane 90. In other words, the flow guide rails or baffles 115 force the vapor mixture 15 to flow deeper into the folds or pleats 100 of the structured membranes 90. A flow of vapor mixture 15 that is more evenly distributed to the pleats 100 by baffles 115 provides for better utilization of the membrane's 90 surface area, thereby, allowing for a reduction in the overall size of the membrane 90 and a reduction in both cost and space requirements associated with the structured membrane 90.

Figure 4A:
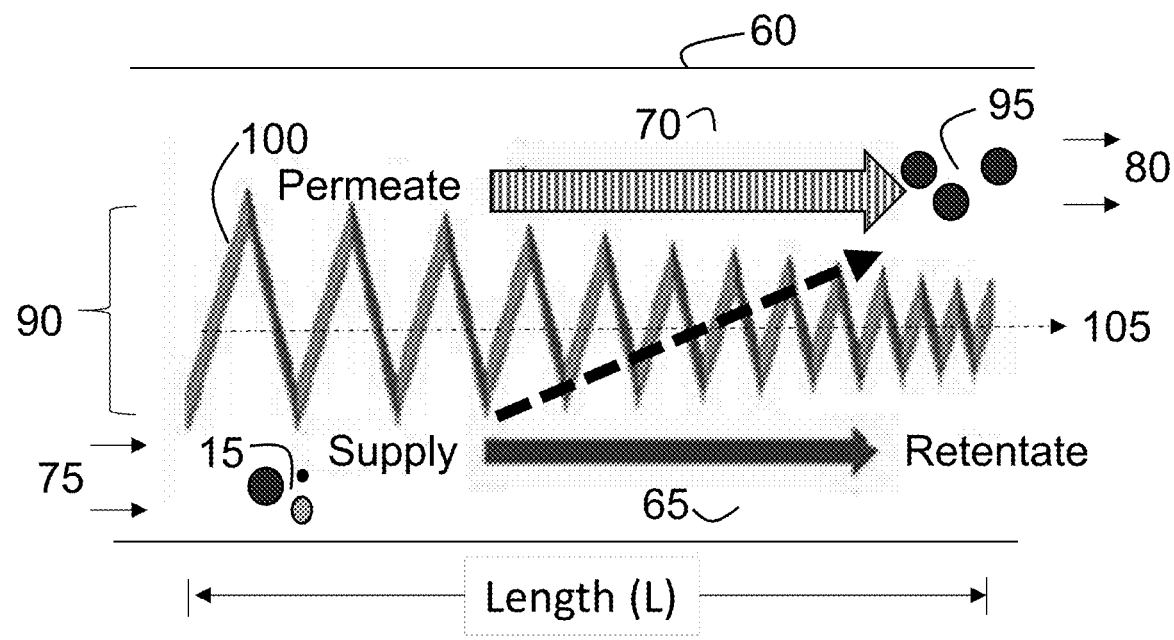
FIG. 4A is a schematic representation of a linear structured membrane with asymmetrical folding.
Figure 4B:
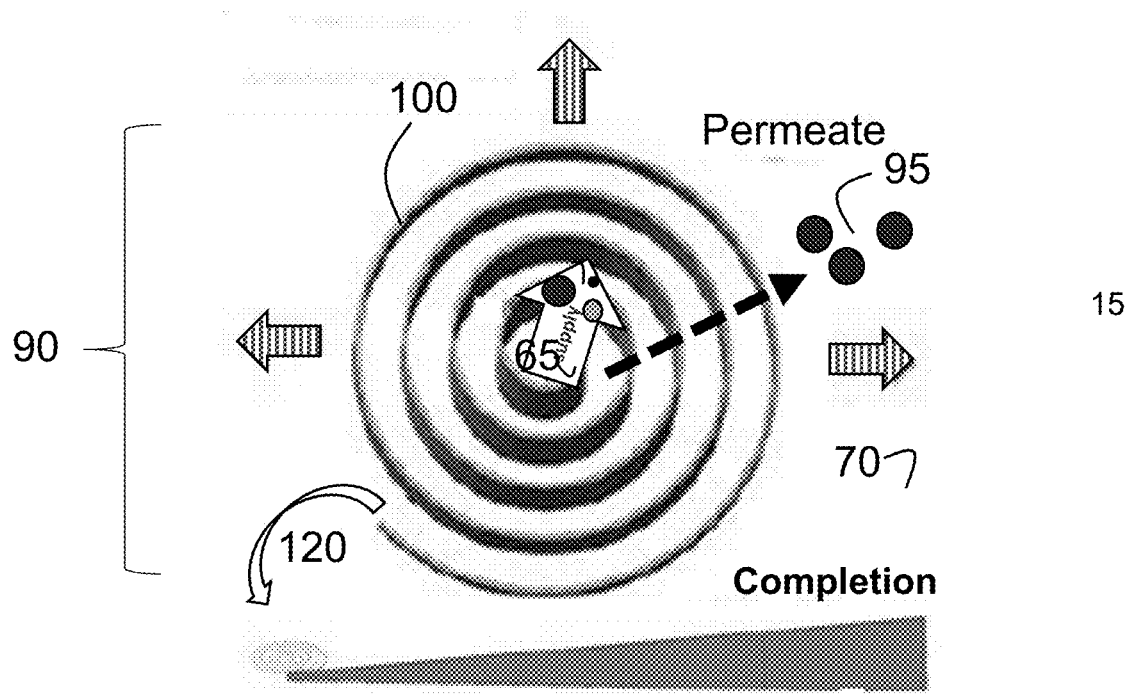
FIG. 4B is a schematic representation of another structured membrane with asymmetrical folding that is rotary wound according to another aspect of the present disclosure.

Referring now to FIGS. 4A and 4B, according to another aspect of the present disclosure, the plurality of pleats or folds 100 in the one or more structured membranes 90 may be asymmetrically folded. In this case, the surface area of the structured membrane 90 exposed to the vapor mixture 15 is greater adjacent to the entrance 75 in the inlet side 65 and tapers to a progressively smaller surface area along a length (L) of the structured membrane. The structured membrane may be linearly folded 105 or rotary wound 120.

The vapor mixture 15 flows along the membrane 90 surface (cross-flow) in the inlet side 65 of the external housing 60, thus gradually flowing the fuel vapor 95 through the membrane 90 to the outlet side 70 of the external housing 60. As a result, the concentration of the fuel vapor 95 at the membrane 90 surface decreases along the flow path, e.g., along the length (L) of the membrane 90. When the structured membrane 90 is asymmetrically folded, the required area of the membrane similarly will decrease along the length (L) of the membrane 90. Thus, asymmetrical folding offers advantages in reducing the installation space required, lowering flow resistance as compared to a symmetrically folded membrane, and in providing for better utilization of the available membrane surface.

Figure 5A:
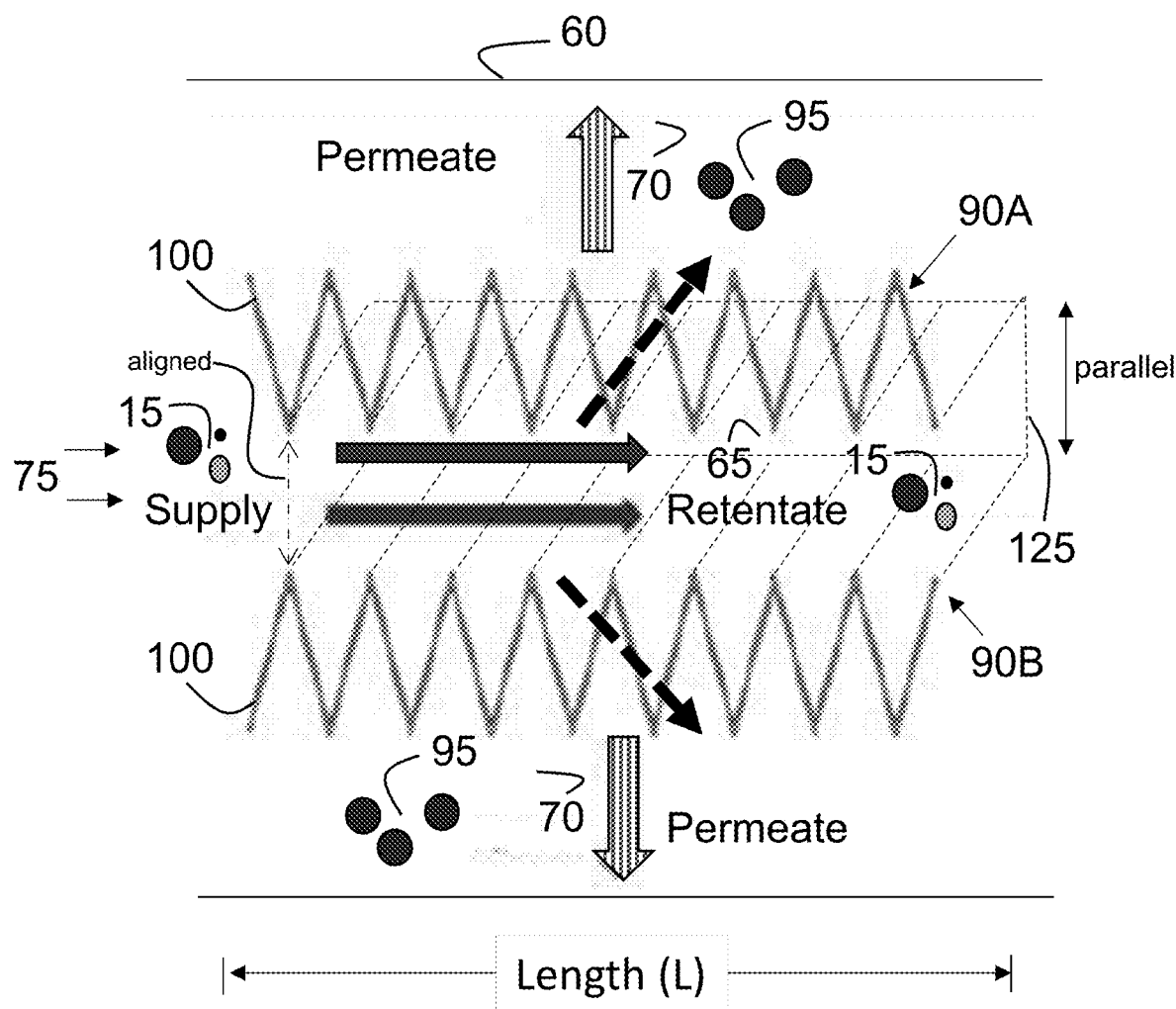
FIG. 5A is a schematic representation of two structured membranes aligned parallel to one another.
Figure 5B:
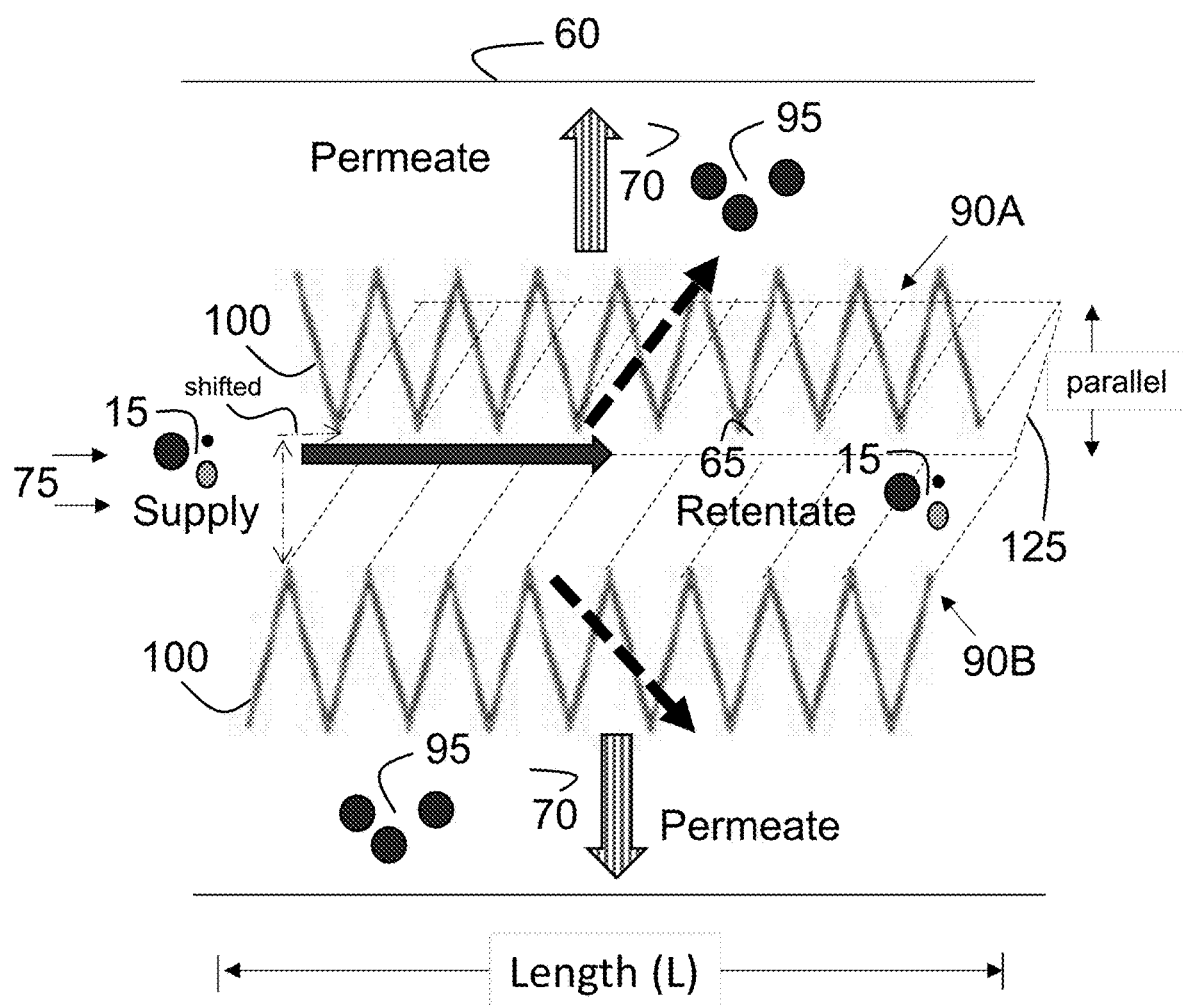
FIG. 5B is another schematic representation of two structured membranes aligned parallel to one another.

Referring now to FIGS. 5A and 5B, the membrane module 50 may comprise at least two structured membranes 90A, 90B. The two structured membranes 90A, 90B may be aligned such that the surface of the structured membranes 90A, 90B are parallel to one another. In this case, the vapor mixture 15 flows centrally between the surface of the two membranes 90A, 90B. The structure of the two membranes 90A, 90B may be substantially the same. Alternatively, the structure of the two membranes may be different. For example, the pleats 100 of the two membranes 90A, 90B may be aligned (FIG. 5A) or the pleats 100 of the two membranes 90A, 90B may be shifted (FIG. 5B) by any desirable amount. When desirable, the two structured membranes may be connected together 125 partially or entirely at one or more ends.

The use of two parallel membranes 90A, 90B doubles the effective area of the membrane along the flow path of the vapor mixture 15. In addition to a smaller space requirement, this parallel folding also ensures improved flow turbulence along the flow path (e.g., along the length (L) of the membrane), thereby achieving homogenization of air and fuel vapor at the membrane 90A, 90B surface.

Figure 6A:
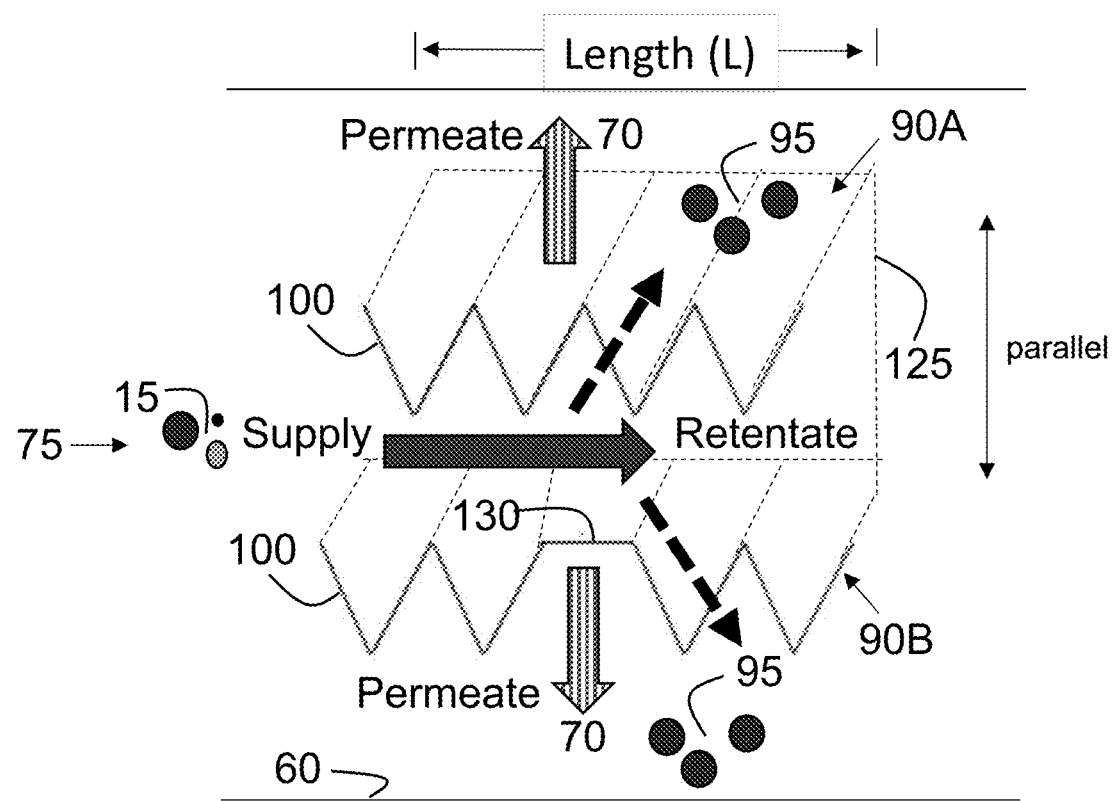
FIG. 6A is a schematic representation of the two structured membranes of FIG. 5 in which an alternative fold is present in at least one of the membranes.
Figure 6B:
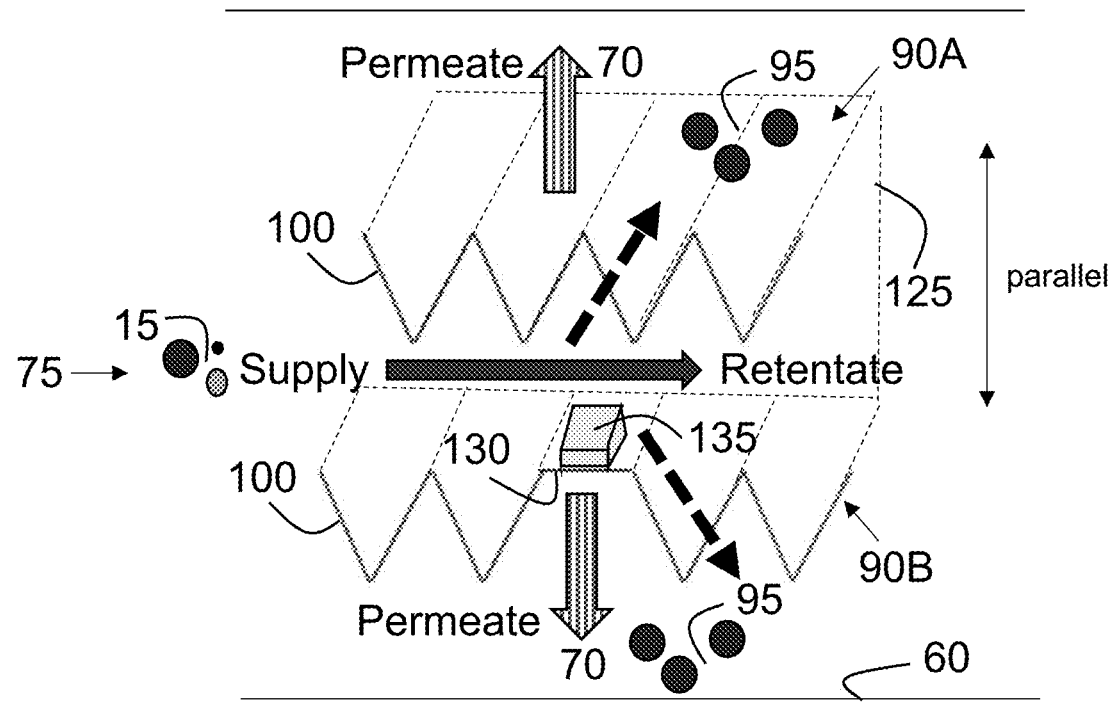
FIG. 6B is a schematic representation of the two structured membranes of FIG. 6A in which a turbulence generator is superimposed upon the alternative fold

Referring now to FIGS. 6A and 6B, the one or more structured membranes 90A, 90B may comprise at least one alternative form 130 located among the pleats or folds 100 aligned orthogonal to a length (L) of the one or more structured membranes 90A, 90B. The alternative form 130 may occupy a small or localized portion of the surface of the membranes 90A, 90B or be repeated over the entire surface of the one or more structured membranes 90A, 90B, including when desired the area used for clamping or sealing the membrane 90A, 90B into the membrane module.

The alternative form 130 may be selected, without limitation, as one among the group of a bulge, a crease, a bead, or a wave. When desirable, the membrane module 50, as well as the structured membranes 90A, 90B may be designed to be spherical in order to become stiffer or to adapt the construction to a cramped installation space condition. The use of various waveforms may also compensate for mechanical stresses due to different coefficients of thermal expansion and protect the membrane against damage due to temperature and pressure fluctuations. However, these characteristics may be interrupted in the areas that include fluid guide elements (e.g., baffles) or in areas that additionally have a fluid-conducting form, which inherently reduces the pressure loss of the system.

Still referring to FIG. 6B, the one or more structured membranes 90A, 90B may further comprise a turbulence generator 135 located approximate to or superimposed upon the at least one alternative form 130. In this case, improved permeation of the structured membrane 90A, 90B by combustible hydrocarbons may be achieved by locally influencing the flow characteristics of the vapor mixture 15.

Figure 7A:
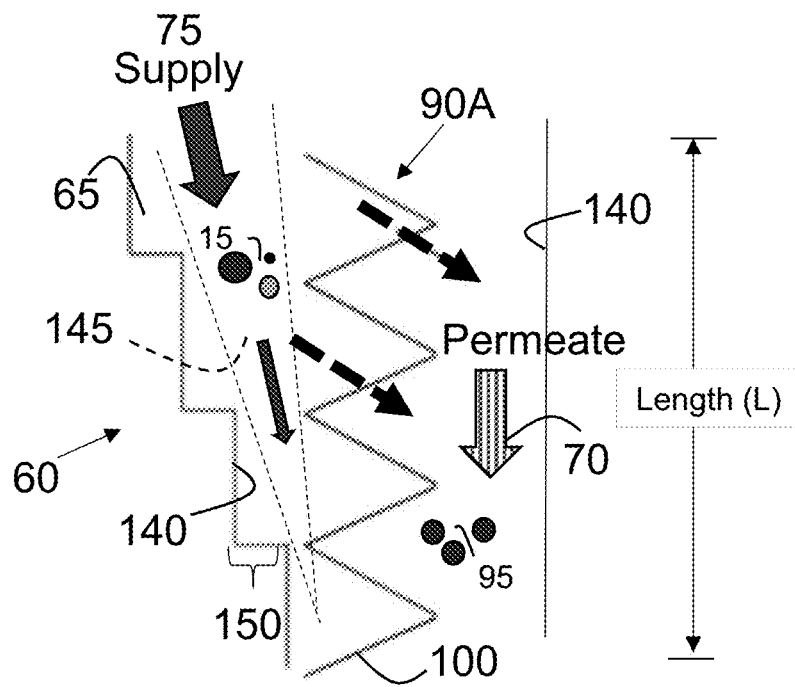
FIG. 7A is a schematic representation of a membrane module having a cascading channel in the inlet side.
Figure 7B:
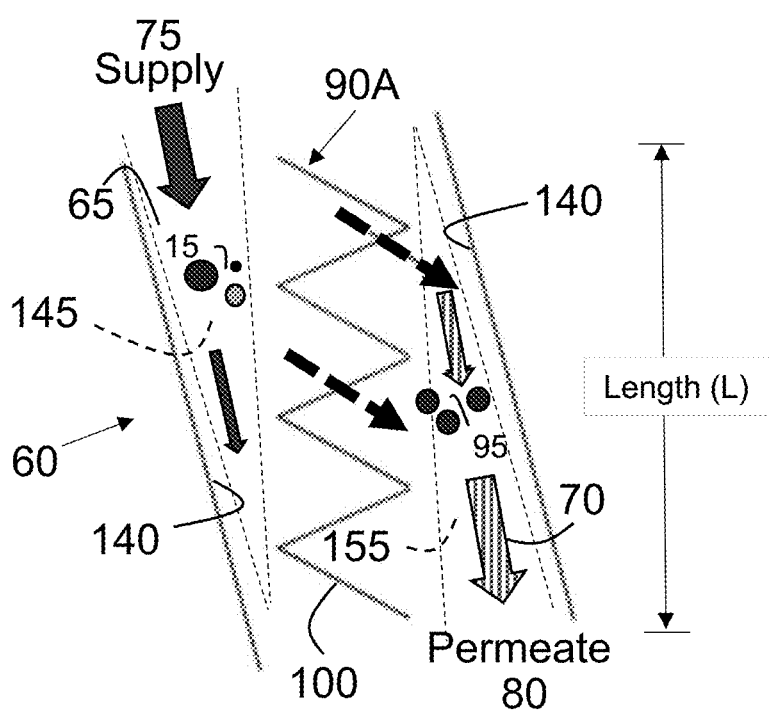
FIG. 7B is a schematic representation of another membrane module having a cascading channel on the inlet side and outlet side.

Referring now to FIGS. 7A and 7b, the external housing 60 includes an internal wall 140 on the inlet side 65 that creates a greater flow channel 145 for the vapor mixture 15 near the entrance 75 and tapers to a progressively smaller flow channel along the length (L) of the one or more structured membranes 90A. This may be accomplished by any method known, including, without limitation by creating cascading steps 150 in the internal wall 140 on the inlet side 65 as shown in FIG. 7A or by slanting the external wall 140 on the inlet side 65 towards the structured membrane 90A along the flow path (e.g., length (L) of the membrane) as shown in FIG. 7B. For this latter case, the external housing 60 may also include an internal wall 140 on the outlet side 70 that creates a greater flow channel 155 for the gaseous fuel vapor 95 near the exit 80 and tapers to a progressively smaller flow channel along the length (L) of the one or more structured membranes 90A. The narrowing channel 145 on the inlet side 65 does justice to the fact that the mass flow on this side of the membrane 90A decreases because a portion of the mass has diffused through the membrane 90A. Accordingly, the channel 155 on the outlet side 70 of the membrane 90A becomes larger to accommodate the increasing mass flow that has permeated through the membrane 90A. In this scenario, the surface are of the membrane 90A is efficiently utilized with a reduction or avoidance of any dead volume in the inlet side 65 and/or outlet side 70.

Figure 8:
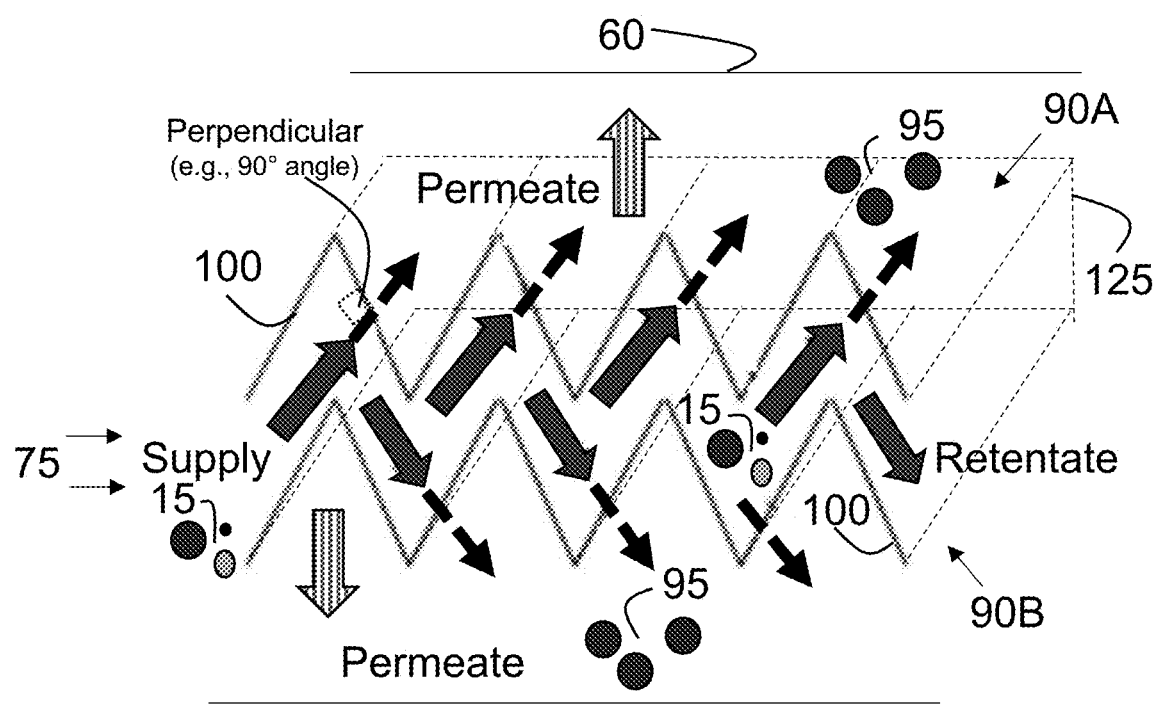
FIG. 8 is a schematic representation of a double-folded membrane in which the flow path of the fuel vapor perpendicularly intersects with the surface of the membrane.

Referring now to FIG. 8, the pleats or folds 100 of at least two structured membranes 90A, 90B may be positioned, such that the flow of the vapor mixture 15 perpendicularly intersects with the surface of the membranes 90A, 90B. In this case, the membranes 90A, 90B are folded (e.g., connected) to provide a uniform flow gradient perpendicular to the membranes 90A, 90B. The flow velocity increases, and thus, the partial pressure difference of the vapor mixture 15 over the membranes 90A, 90B by the use of a double folded (e.g., connected 125) membrane 90A, 90B. As a result, the surface of the membranes 90A, 90B are effectively utilized with any unused surface area being reduced, which corresponds to a reduction in cost and required space.

Referring once again to FIGS. 1A, 1B, and 1C, an evaporative emission control (EVAP) system 1 for use in reducing diurnal breathing loss (DBL) emissions is provided. This EVAP system 1 may comprise the canister 35A as previously defined above. This canister 35A comprises a membrane module 50 having one or more structured membranes 90. Alternatively, the membrane module 50 includes a plurality of structured membranes 90A, 90B. The structured membranes 90A, 90B may comprise an organic polymer, a copolymer, or a mixture thereof that is permeable to gaseous combustible hydrocarbons, an adsorbent material that adsorbs the vapor mixture 15, or a combination thereof.

In the EVAP system 1, the canister 35A may be connected in series to a second or main canister 35B. This second canister 35B may contain an adsorbent material capable of adsorbing fuel vapor 95. Although the second canister 35B is shown to precede canister 35A in the flow path of the vapor mixture 15 arising from the fuel tank 5 in the EVAP system 1 shown in FIG. 1A, one skilled in the art will understand that this order may be reversed with canister 35A preceding the second canister 35B without exceeding the scope of the present disclosure. The adsorbent material is one selected from activated carbon, carbon charcoal, zeolites, clays, porous polymers, porous alumina, porous silica, molecular sieves, kaolin, titania, ceria, or combinations thereof.

Within this specification, embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

The foregoing description of various forms of the invention has been presented for purposes of illustration and description. It is not intended to be exhaustive or to limit the invention to the precise forms disclosed. Numerous modifications or variations are possible in light of the above teachings. The forms discussed were chosen and described to provide the best illustration of the principles of the invention and its practical application to thereby enable one of ordinary skill in the art to utilize the invention in various forms and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A canister for use in an evaporative emission control (EVAP) system, the canister comprising:
an external housing;
a membrane module that separates the external housing into an inlet side and an outlet side;
an entrance located on the inlet side of the external housing, the entrance being in fluid communication with a fuel tank, such that a vapor mixture from the fuel tank flows into the inlet side of the external housing;
an exit located on the outlet side of the external housing, the exit being in fluid communication with an internal combustion engine;
a first valve that reversibly connects the inlet side of the external housing to atmosphere; and
optionally, a second valve that reversibly connects the outlet side of the external housing to atmosphere;
wherein the membrane module includes one or more structured membranes having a surface with a plurality of pleats or folds; the one or more structured membranes being shaped as a flat sheet or into a cylindrical geometry;
wherein the vapor mixture flows from the entrance in the inlet side of the external housing along the surface of the one or more structured membranes, such that fuel vapor present in the vapor mixture permeates through the membrane to the outlet side of the external housing;
wherein the one or more structured membranes comprise at least one alternative form among the pleats or folds orthogonal to a length (L) of the one or more structured membranes over a localized portion of the surface or over the entire surface of the one or more structured membranes.

2. The canister according to claim 1, wherein the membrane module further comprises one or more flow guide rails or baffles.

3. The canister according to claim 2, wherein the flow of the vapor mixture along the surface of the one or more structured membranes is uniformly distributed.

4. The canister according to claim 1, wherein the plurality of pleats or folds in the one or more structured membranes are asymmetrically folded.

5. The canister according to claim 4, wherein surface area of the structured membrane exposed to the vapor mixture is greater adjacent to the entrance and tapers to a progressively smaller surface area along a length (L) of the structured membrane.

6. The canister according to claim 4, wherein the structured membrane is linearly folded or rotary wound.

7. The canister according to claim 1, wherein the membrane module comprises at least two structured membranes with the surface of the structured membranes being parallel to one another and connected together at one end;
wherein the vapor mixture flows centrally between the surface of the two structured membranes.

8. The canister according to claim 7, wherein the at least two structured membranes are substantially the same.

9. The canister according to claim 7, wherein the pleats or folds of the at least two structured membranes are positioned, such that the flow of the vapor mixture perpendicularly intersects with the surface of the at least two structured membranes.

10. The canister according to claim 1, wherein the alternative form is selected as one among the group of a bulge, a crease, a bead, or a wave.

11. The canister according to claim 1, wherein the one or more structured membranes further comprise a turbulence generator located approximate to the at least one alternative form.

12. The canister according to claim 1, wherein the external housing includes an internal wall on the inlet side that creates a greater flow channel for the vapor mixture near the entrance and tapers to a progressively smaller flow channel along the length (L) of the one or more structured membranes.

13. The canister according to claim 12, wherein the external housing includes an internal wall on the outlet side that creates a greater flow channel for the gaseous fuel vapor near the exit and tapers to a progressively smaller flow channel along the length (L) of the one or more structured membranes.

14. The canister according to claim 1, wherein the one or more structured membranes comprise an organic polymer, a copolymer, or a mixture thereof that is permeable to gaseous combustible hydrocarbons, an adsorbent material that adsorbs the fuel vapor, or a combination thereof.

15. An evaporative emission control (EVAP) system for use in reducing diurnal breathing loss (DBL) emissions, the EVAP system comprising the canister according to claim 1.

16. The EVAP system according to claim 15, wherein the canister comprises a plurality of structured membranes.

17. The EVAP system according to claim 16, wherein the plurality of structured membranes comprise an organic polymer, a copolymer, or a mixture thereof that is permeable to gaseous fuel vapor, an adsorbent material that adsorbs the fuel vapor, or a combination thereof.

18. The EVAP system according to claim 15, wherein the canister is connected in series to a second or main canister; the second canister containing an adsorbent material capable of adsorbing fuel vapor.

19. The EVAP system according to claim 18, wherein the adsorbent material is one selected from activated carbon, carbon charcoal, zeolites, clays, porous polymers, porous alumina, porous silica, molecular sieves, kaolin, titania, ceria, or combinations thereof.

* * * * *